Sept. 2, 1969   H. VERDIER   3,464,477
PNEUMATIC TIRE
Filed June 26, 1967
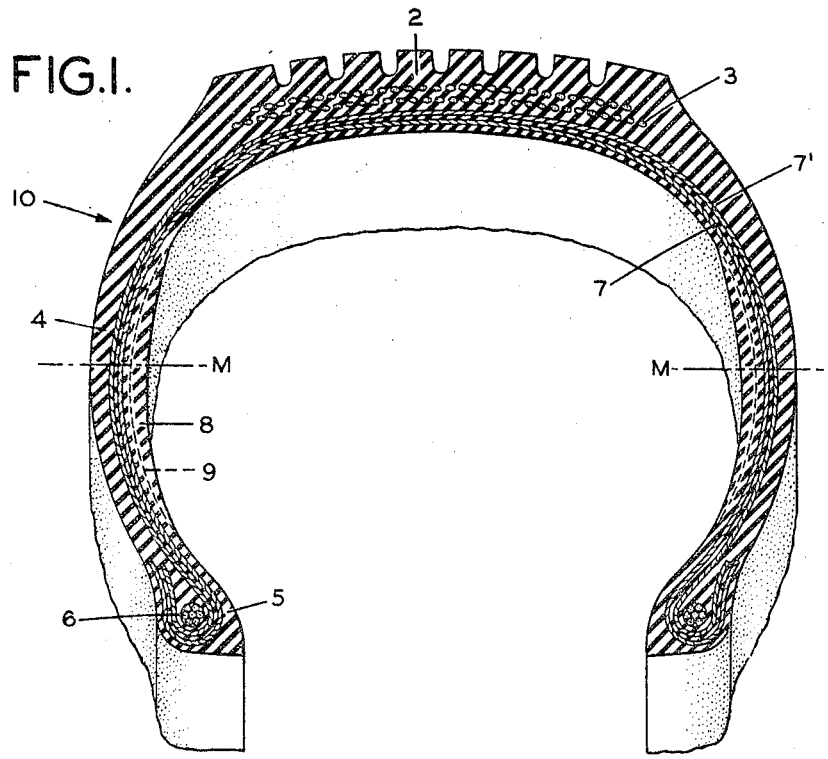
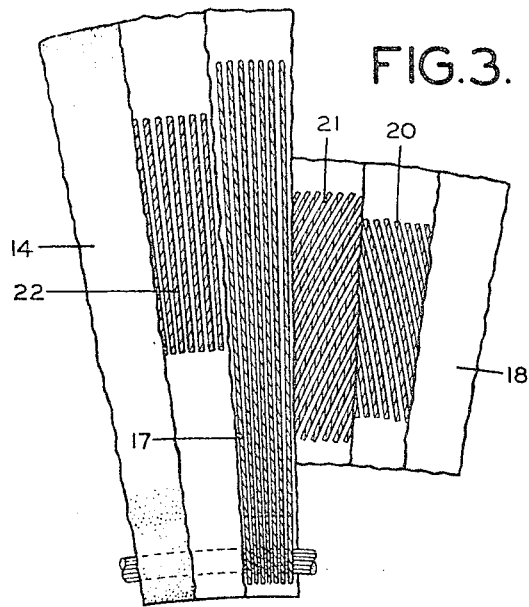
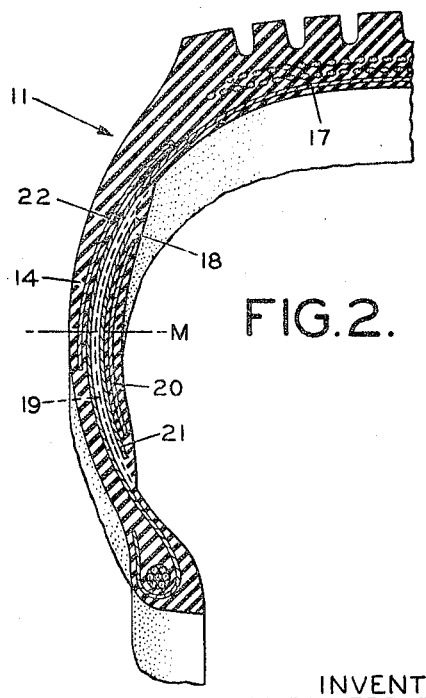
INVENTOR
HENRI VERDIER
BY
HIS ATTORNEYS United States Patent Office 3,464,477
Patented Sept. 2, 1969

3,464,477
PNEUMATIC TIRE
Henri Verdier, Beauregard-l'Eveque, France, assignor to Compagnie Generale des Etablissements Michelin, raison sociale Michelin & Cie, Clermont-Ferrand, Puy-de-Dome, France
Filed June 26, 1967, Ser. No. 648,864
Claims priority, application France, June 28, 1966, 67,347
Int. Cl. B60c 5/00, 9/24, 13/00
U.S. Cl. 152—353        7 Claims

ABSTRACT OF THE DISCLOSURE

The invention is a pneumatic tire, particularly for off-highway use, having a radial carcass and a reinforced tread and containing a reinforcing layer of elastomer or a layer of elastomer containing elastic cords disposed in the sidewalls of the tire and inwardly of the carcass to reinforce the tire sidewalls against damage, the reinforcing layer having a maximum thickness at the midheight of the tire between about 1% and 3% of the maximum width of the tire and decreasing in thickness from its midportion toward the tread and the corresponding bead of the tire.

---

This invention relates to improvements in pneumatic tirese and more particularly to improvements in tires of the type having radial cord carcasses and a reinforced tread suitable for off-highway use on rocky or rough terrain.

It is recognized that radial carcass tires provided with a tread stiffening reinforcement of crown or peak plies have many advantages for both highway and off-highway use. Under both conditions of use, such tires have greater tread life than tires having bias-laid plies and, moreover, they have superior roadability. However, when such radial carcass tires are used on rocky or rough ground as in off-highway use, the sidewalls have been found to be less resistant to cuts, abrasion and other damage, such as, for example, by stones which wedge between the tires on dual wheels, than tires having the bias-laid carcass cords or plies. The lesser resistance to damage of the radial carcass tire possibly is due to the use of fewer plies in the sidewalls of the tire and the greater flexibility of the sidewalls than in the case of tires having bias-ply carcasses.

In accordance with the present invention, reinforcements are included in radial ply tires which overcome the sensitivity of such tires to damage to the sidewalls thereof without adversely affecting the other favorable advantages of such radial ply tires. More particularly, in accordance with the present invention, it has been found, surprisingly, that in order to improve the resistance of the sidewalls of radial ply tires to damage, the sidewalls should be reinforced inwardly of the carcass plies rather than outwardly of the carcass plies. Accordingly, radial ply tires embodying the present invention include a reinforcement disposed inwardly of the radial carcass cords or cables which has a maximum thickness at the mid height of the sidewall of the tire between about 1% and 3% of the overall maximum width of the tire, the reinforcement tapering toward its edges, that is, toward the tread and toward the corresponding bead of the sidewall and extending about half of the height of the tire. The reinforcement can consist of a layer of an elastomer, such as rubber, the composition of which is not very important other than that it should not have a hysteretic loss greater than 25%, or a layer of the elastomer containing one or more plies of elastic cords of metallic or non-metallic type arranged radially or only slightly inclined to the radial direction, for example, at an angle between about 10 and 30° to the radial. Suitable elastic cords for reinforcing the internal layer of the tire are polyamide cords, such as nylon, or elastic metallic cables of the type disclosed, for example, in U.S. Patents Nos. 3,090,189 and 3,090,190.

The resistance to abrasion and damage to the sidewalls can also be improved by means of a ply of elastic cords of the radial or slightly inclined type introduced into the sidewall of the tire in the area which is most exposed to damage, that is, extending from slightly inwardly of the mid height of the tire to about the shoulder of the tread.

For a better understanding of the present invention, reference may be had to the accompanying drawings, in which:

FIGURE 1 is a cross-sectional view of a tire embodying the present invention;

FIGURE 2 is a cross-sectional view of one-half of a tire showing a modified type of reinforcement therefor; and FIGURE 3 is a side elevational view of a portion of the tire shown in FIGURE 2, partially broken away to disclose the arrangement of the plies therein.

A tire 1 chosen for purposes of illustration as shown in FIGURE 1, includes a tread 2 containing a tread or crown reinforcement 3 of plies of crossed cords, and opposite sidewalls 4, each terminating in a bead 5 reinforced with a bead wire or cable 6. A carcass consisting of two plies 7 and 7' of cords have their edges wrapped around the bead wire or cable 6 and extend through the sidewalls and inwardly of the tread and tread reinforcement of the tire.

In conventional tires, the inner wall or surface of the tire would be as represented by the dotted line 9, that is, a thin layer of rubber or other elastomer is disposed inwardly of the innermost carcass ply 7.

In accordance with the present invention, the tire 1 is provided with an internal layer 8 of an elastomer such as rubber, this layer having its greatest thickness at about the mid height of the sidewall, indicated by the line M. In this tire, the rubber layer 8 has a maximum thickness of 4 mm. which corresponds to approximately 3% of the cross-sectional width of the tire and is approximately equal to the thickness of the rubber in the portion of the sidewall of the tire outside of the ply 7'. A suitable composition for the layer 8 is as follows:

| | Parts by wt. |
|---|---|
| Natural rubber | 100 |
| Stearic acid | 2 |
| Anti-aging agent (phenyl betanaphthylamine) | 1.5 |
| Zinc oxide | 5 |
| HAF black | 35 |
| Sulfur | 2.8 |
| Accelerator (benzothiazyle disulfide | 0.7 |

Temperature of curing, 140° C.
Duration of curing, 60 minutes.
Hysteretic loss, 9%.

In the modified form of tire shown in FIGURES 2 and 3, the carcass comprises a single layer of steel cables 17 and, in accordance with the invention, a rubber layer 18 is provided in the inside of the tire inwardly of the ply 17. The maximum thickness of the layer 18 is approximately 2½% of the width of the tire measured at the mid sidewall indicated by the dot-dash line M. Two plies 20 and 21 of nylon cords are embedded in and bonded to the layer 18 and are inclined in crossing relation at an angle of about 20° to the radial. Moreover, outside of the carcass ply 17 is added a ply of elastic metal cords 22 which extend radially of the tire. The ply 22 extends, as do the cord plies 20 and 21, over a height which is substantially equal to one-half the height of the cross-section of the tire. However, the ply 22 is not centered in the sidewall of the tire but is offset toward the tread. As shown in FIGURE 2, the dotted line 19 represents the contour of the interior surface of the sidewall of a conventional tire without the rubber layer 18. It should be noted that the rubber layer 8 or the layer 18 tapers toward its upper and lower edges and terminates short of the shoulder of the tread 2 and the bead 5 of the tire.

In a 1400 x 25 size tire, used, for example, on road-building equipment and manufacture as disclosed in FIGURES 2 and 3, the reinforcement of the sidewalls of the tire may consist of layers 18 of rubber identical to the rubber of the sidewalls 14 and having a thickness of 8 mm. at the mid-height of the sidewall. Two plies 20 and 21 of nylon cords are embedded in the layer 18. The outer ply 22 is composed of elastic metal cords.

The nylon cords of the plies 20 ad 21 may consist of three strands of nylon of 840 denier each, twisted together.

The cords of the ply 22 may consist of three strands of seven steel wires twisted together, each having a diameter of 0.18 mm., the twisting being effected in such a manner as to provide the cords with a modulus of elasticity below 5000 DaN/mm.² and preferably less than 1500 DaN/mm.². The modulus of elasticity E referred to above is determined by the equation, $$\frac{F}{S} = E \frac{dl}{l}$$

in which S and $l$ designate, respectively, the cross-section in mm.² and the initial length of a cord sample in millimeters and $dl$ its elongation under the effect of a force F in grams equal to one-tenth of the breaking load of the cord. Methods of manufacturing cords of the type described are disclosed, for example, in U.S. Patents Nos. 3,090,189 and 3,090,190.

Tires of the type described above, when mounted on dual wheels, have been driven without damage to their sides by a stone wedged between the tires over a distance ten times as great as tires having, in addition to the carcass 17, only the reinforcing ply 22. The presence of the layer 18 in the sides of the tire and the plies 20 and 21 doubles the shock resistance, and the resistance to ripping or gashing by cutting objects is almost doubled.

Other tests have also shown surprisingly increased resistance to damage by tires containing the inner reinforcing layer as compared with tires provided with similar reinforcing layers exterior to the carcass of the tire, thereby indicating that the inwardly disposed layer has some unexpected reinforcing effect on the radial carcass plies possibly related to positioning the radial plies in the neutral zone of the sidewalls of the tire.

It will be understood that the invention comprehends tires of different sizes and load-carrying capacities and modification in the tread, beads and the composition and number of plies in the carcass and, accordingly, the examples of the invention described above should be considered as illustrative and not as limiting the scope of the invention.

I claim:
1. A pneumatic tire comprising a tread, sidewalls extending inwardly from said tread and beads at inner edges of said sidewalls, a radial cord carcass extending from said beads through said sidewalls and at least to the adjacent edge of said tread and layers of an elastomer on the inner surfaces of each of said sidewalls inwardly of said carcass, said layers having a maximum thickness between 1% and 3% of the maximum width of said tire and said elastomer having a hysteretic loss not greater than 25%.

2. The tire set forth in claim 1 in which said layers decrease in thickness from about the mid-height of said tire toward the bead and the tread.

3. A pneumatic tire comprising a tread, sidewalls extending inwardly from said tread and beads at the inner edges of said sidewalls, a radial cord carcass etxending from said beads through said sidewalls and at least to the adjacent edge of said tread and layers of an elastomer on the inner surfaces of each of said sidewalls inwardly of said carcass, said layers having a maximum thickness between about 1% and 3% of the maximum width of said tire, and at least one ply of elastic cords in each of said layers inclined at not more than 30° to the radial cords outwardly thereof.

4. The tire set forth in claim 3 in which said elastic cords have a modulus of elasticity less than 5000 DaN/mm.².

5. The tire set forth in claim 1 comprising an additional ply of elastic cords in each sidewall disposed outwardly of said carcass and extending between about mid-height of said tire and the adjacent edge of said tread.

6. A pneumatic tire comprising a tread, sidewalls extending inwardly from said tread and beads at the inner edges of said sidewalls, a radial cord carcass extending from said beads through said sidewalls and at least to the adjacent edge of said tread and layers of an elastomer on the inner surfaces of each of said sidewalls inwardly of said carcass, said layers having a maximum thickness between about 1% and 3%/ of the maximum width of said tire, and a pair of plies of elastic polyamide cords in each of said layers, the cords of one ply crossing the cords of the other ply, said layers and said plies therein terminating short of said bead and the edge of said tread adjacent to said sidewall.

7. The tire set forth in claim 6 comprising at least one ply of elastic metallic cords in each sidewall of said tire outwardly of said carcass and extending between about mid-height of each sidewall and the adjacent edge of said tread.

References Cited

UNITED STATES PATENTS

| | | | |
|---|---|---|---|
| 3,207,200 | 9/1965 | Boussu et al. | 152—354 |
| 3,253,636 | 5/1966 | Travers | 152—354 |

ARTHUR L. LA POINT, Primary Examiner

C. B. LYON, Assistant Examiner

U.S. Cl. X.R.

152—360, 367